United States Patent [19]
Choi et al.

[11] Patent Number: 5,897,609
[45] Date of Patent: Apr. 27, 1999

[54] MULTIPLE PORT PROTOCOL TEST APPARATUS AND METHOD THEREOF

[75] Inventors: Jin-Young Choi; Weon-Soon Kim, both of Daejeon, Rep. of Korea

[73] Assignees: Electronics and Telecommunications Research Institute, Daejeon; Korea Telecommunication Authority, Seoul, both of Rep. of Korea

[21] Appl. No.: 08/771,268

[22] Filed: Dec. 20, 1996

[30] Foreign Application Priority Data

Dec. 21, 1995 [KR] Rep. of Korea ........................ 95-53195

[51] Int. Cl.$^6$ ............................... H04J 3/14; H04M 3/08
[52] U.S. Cl. ........................ 702/122; 702/121; 702/123; 370/241; 370/252; 370/250; 370/469; 395/183.01
[58] Field of Search ..................................... 702/122, 121, 702/123; 370/241, 252, 250, 469; 395/183.01, 183.06, 183.08, 183.22

[56] References Cited

U.S. PATENT DOCUMENTS

| | | | |
|---|---|---|---|
| 4,419,751 | 12/1983 | Cholat-Namy et al. | 370/241 |
| 5,027,343 | 6/1991 | Chan et al. . | |
| 5,375,159 | 12/1994 | Williams | 370/241 |
| 5,477,544 | 12/1995 | Botelho | 395/280 |
| 5,737,518 | 4/1998 | Grover et al. | 395/183.14 |
| 5,757,680 | 5/1998 | Boston et al. | 702/122 |
| 5,757,778 | 5/1998 | Kim et al. | 370/252 |

OTHER PUBLICATIONS

Design and Implementation of Multi–Party Tester; Koji Okamura, Fumiaki Sato, Kotaro Katsuyama and Tadanori Mizuno; 1991; pp. 259–266.

Measurement Techniques and Equipment for B–ISDN; Reto Grunenfelder; 1993; pp. 21.3–1 to 21.3–9.

Design of Intelligent OSI Protocol Monitor; Tomohiko Ogishi, Akira Idoue, Toshihiko Kato and Kenji Suzuki; pp. 351–366.

*Primary Examiner*—John Barlow
*Assistant Examiner*—Hien Vo
*Attorney, Agent, or Firm*—Antonelli, Terry, Stout & Kraus, LLP

[57] ABSTRACT

An improved multiple port protocol test apparatus and a method thereof by which it is possible to more easily perform a test with respect to the multiple port protocol, and increase an adaptability and interrelationship with respect to the standard of the system. The apparatus includes a test management unit for testing and controlling a protocol and performing management related thereto, a multiple port protocol testing unit connected to the test management unit for generating and controlling a test event with respect to the multiple port of a network system, a plurality of lower protocol processing unit connected to the multiple port protocol testing unit for performing an emulation function with respect to a lower protocol of the test objective protocol, and transferring a test-related event, a timer processing unit connected to the multiple port protocol testing unit for processing a timer information, a message distribution unit connected to the lower protocol processing unit for transferring a test event to a corresponding port of the test objective system, and transferring the received event to the lower protocol processing unit of a corresponding port, and a test objective system access unit connected to the message distribution unit for a physical connection with a test objective system.

5 Claims, 2 Drawing Sheets

MULTIPLE PORT PROTOCOL TEST APPARATUS AND METHOD THEREOF

BACKGROUND OF THE INVENTION

1. Field of the Invention

The present invention relates to a multiple port protocol test apparatus and a method thereof, and particularly, to an improved multiple port protocol test apparatus and a method thereof which are capable of more easily performing a test with respect to a multiple port protocol, and increasing an adaptability and interrelationship with respect to the standardization of the system.

2. Description of the Conventional Art

In a Broadband Integrated Services Digital Network (B-ISDN), a network system which works based on an input/output of a multiple port needs a test system different from a conventional single port test method.

For such a test system, the test method must have a function of generating and controlling an event with respect to the multiple port of the network system. For example, the method must have a function of connecting a B-ISDN user-network interface call and an answer function with respect to a request of a network system. In addition, when testing a protocol with respect to the connection between a point and multiple points, the above-described characteristic must be considered with respect to the multiple port of the network system.

SUMMARY OF THE INVENTION

Accordingly, it is an object of the present invention to provide an improved multiple port protocol test apparatus and a method thereof which overcomes the problems encountered in the conventional art.

It is another object of the present invention to provide an improved multiple port protocol test apparatus and a method thereof by which it is possible to more easily perform a test with respect to the multiple port protocol, and increase an adaptability and interrelationship with respect to the standard of the system.

To achieve the above objects, there is provided an improved multiple port protocol test apparatus which includes a test management unit for testing and controlling a protocol and performing a management related thereto, a multiple port protocol testing unit connected to the test management unit for generating and controlling a test event with respect to the multiple port of a network system, a plurality of lower protocol processing unit connected to the multiple port protocol testing unit for performing an emulation function with respect to a lower protocol of the test objective protocol, and transferring a test-related event, a timer processing unit connected to the multiple port protocol testing unit for processing a timer information, a message distribution unit connected to the lower protocol processing unit for transferring a test event to a corresponding port of the test objective system, and transferring the received event to the lower protocol processing unit of a corresponding port, and a test objective system access unit connected to the message distribution unit for a physical connection with a test objective system.

To achieve the above objects, there is provided an improved multiple port protocol test method which includes the steps of a first step (21 through 26) for initializing the system, setting a communication path with the plurality of lower protocol processing unit, performing a test, receiving a test event based on a test result, and judging the test event type, a second step (28, 31 through 34) for analyzing and processing a received event when an event is received from one of the multiple lower protocol processing unit as a result of the first step (21 through 26), and terminating the test or continuing the test as a result of the analysis, a third step (29 and 30) for outputting a message which informs that the test is being performed when the event is received from the test management unit as a result of the judgement of the first step (21 through 26), and a fourth step (27, 32 through 34) for processing the event when a timer expiry event occurred as a result of the first step (21 through 26); terminating the test in accordance with the comparison result of the test termination condition, and continuing the routine, wherein the multiple port protocol test apparatus includes a test management unit for testing and controlling a protocol and performing a management related thereto, a multiple port protocol testing unit connected to the test management unit for generating and controlling a test event with respect to the multiple port of a network system, a plurality of lower protocol processing unit connected to the multiple port protocol testing unit for performing an emulation function with respect to a lower protocol of the test objective protocol, and transferring a test-related event, a timer processing unit connected to the multiple port protocol testing unit for processing a timer informantion, a message distribution unit connected to the lower protocol processing unit for transferring a test event to a corresponding port of the test objective system, and transferring the received event to the lower protocol processing unit of a corresponding port, and a test objective system access unit connected to the message distribution unit for a physical connection with a test objective system.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
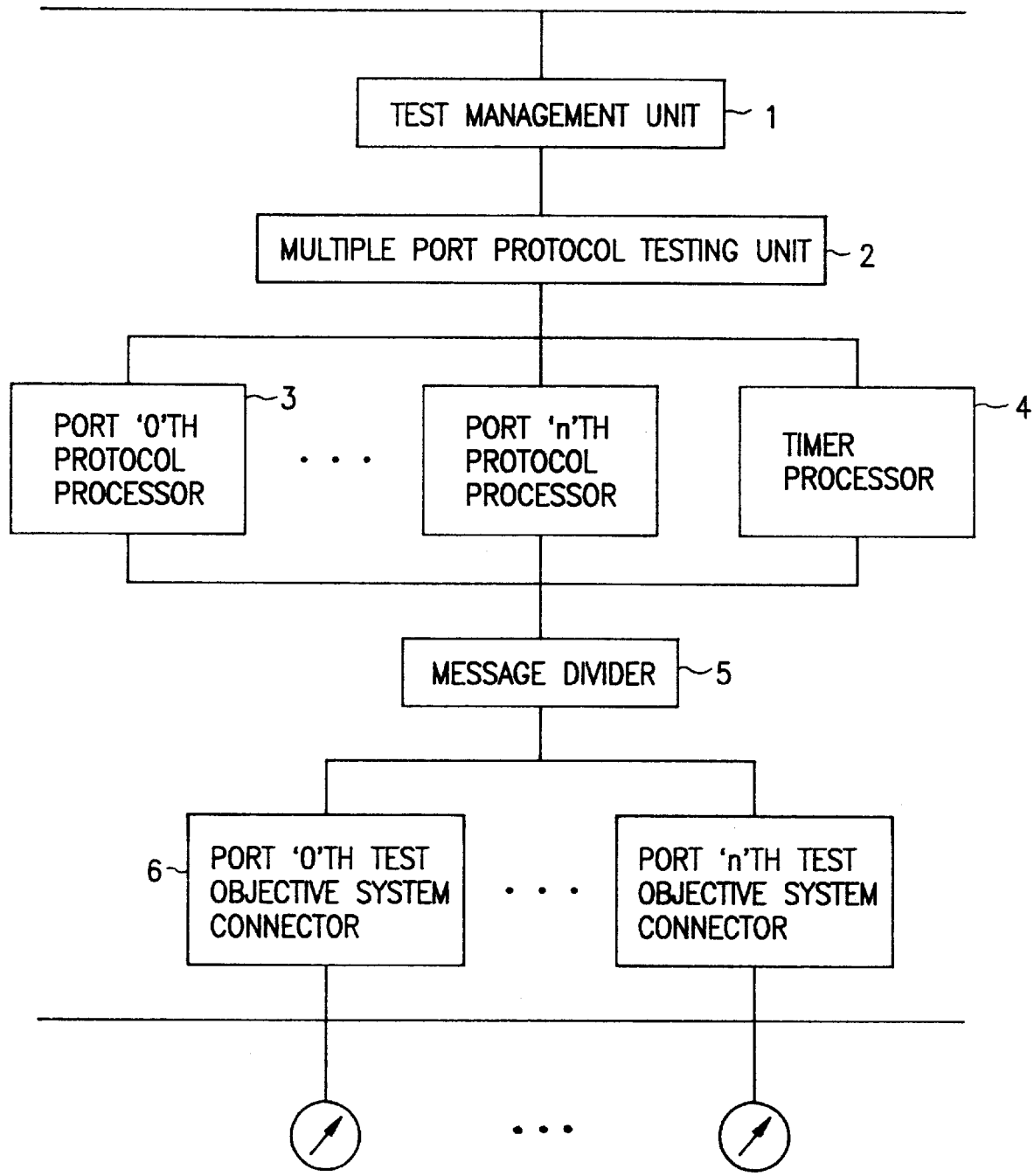
FIG. 1 is a view illustrating a multiple port protocol test apparatus according to the present invention.

FIG. 1 is a view illustrating a multiple port protocol test apparatus according to the present invention.

In the drawing, reference numeral 1 denotes a test management unit, 2 denotes a multiple port protocol testing unit, 3 denotes lower protocol processing units, denotes a timer processing unit, 5 denotes a message distribution unit, and 6 denotes a test objective system access unit.

The test management unit 1 serves to perform, control, and manage a protocol test. In addition, the multiple port protocol testing unit 2 is connected to the test management unit 1 and servers to perform a function for generating and controlling a test event with respect to the multiple port of the network system.

The lower protocol processing units 3 with respect to an N-number of ports are connected to the multiple port protocol testing unit 2, performs an emulation function with respect to the lower protocol of the test objective protocol, and provides a function for transferring a test-related event. In addition, the timer processing unit is connected to the multiple port protocol testing unit 2 for processing a timer information.

The message distribution unit 5 is connected to the lower protocol processing unit 3s, transmits the test event to a corresponding port of the test objective system, and performs a function for transferring the received event to the lower protocol processing units 3 of a corresponding port.

An N-number of the test objective system access units 6 are provided. The test objective system access units 6 are connected of the message distribution unit 5 for controlling a physical connection with the test objective system. The physical connection with the test objective system is formed so that various physical connections can be performed based on a single mode optical fiber. A programming interface method (TCP/IP socket interface, etc) may be used in order for various process communication to be performed between testing units.

Figure 2:
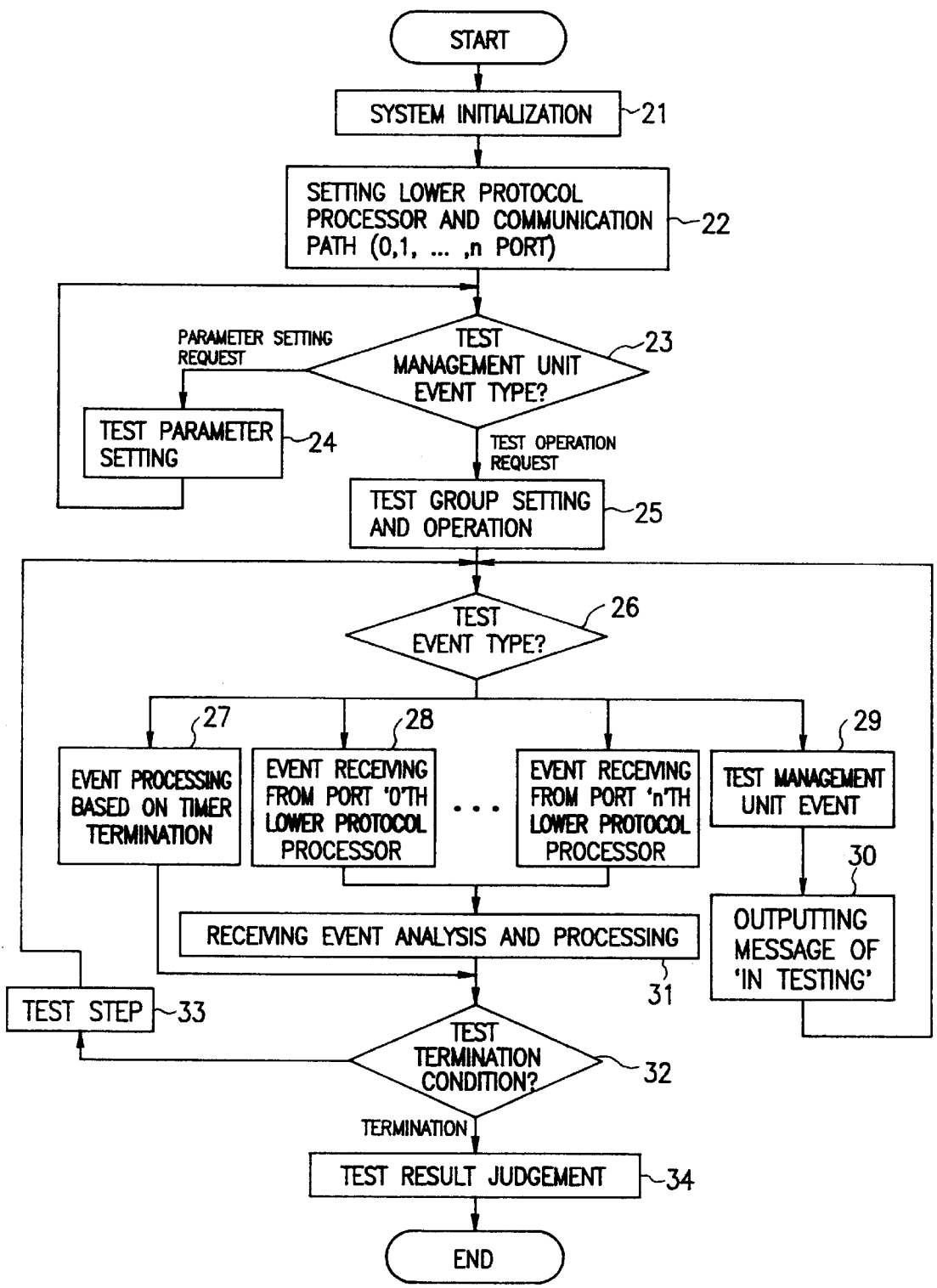
FIG. 2 is a flow chart of a multiple port protocol test method according to the present invention.

FIG. 2 is a flow chart of a multiple port protocol test method according to the present invention.

A system initialization is performed with respect to the number of ports, an address, a port identifier, etc., of the test objective system, and a communication path with the lower protocol processing units 3 is set in step 22, and an event is received from the test management unit 1, and the type thereof is judged in step 23.

As a result of the judgement, if the type is related to a parameter setting request, various test parameters are set in step 2, and then the steps from the test management event type judgement step 23 is repeatedly performed. If the type is related to the test operation request, a test group and a test item are set, and then the test is performed in step 25.

Thereafter, as a result of the test, if the test event is received, the type of the test event is judged in step 26, and if the event is received from the lower protocol processing units 3 of a port in step 28, the event is analyzed and processed. The result of the analysis and process are compared with a test termination condition in step 32. As a result of the comparison, if it is related to the termination, the test result is judged in step 3, and then the test is terminated. If the comparison result is not related to the termination, namely, it is related to a continuous operation, the next test step is performed in step 33. Thereafter, the routine is repeatedly performed from step 26 in which the test event is received, and the type thereof is judged.

The received test event type is judged. If the event is received from the test management unit 1 in step 29, a message of "In testing" is outputted so as to inform a user that the routine is being processed in step 30, and the routine from step 26 in which the test event is received and the type thereof is judged, is repeatedly performed.

As a result of the judgement with respect to the received test event type, if the timer expiry event occurred, the event related thereto is processed in step 27, and is compared with the test termination condition in step 32. If the comparison result is related to the termination, the test result is judged in step 3, and the test is terminated. If the comparison result is not related to the termination, namely, it is related to the continuous operation, the next test step is performed in step 33, and then the routine is repeatedly performed from step 26 in which the test event is received, and the type thereof is judged.

As described above, the multiple port protocol test apparatus and a method thereof according to the present invention is directed to more easily performing a test with respect to the multiple port protocol, and increasing an adaptability and interrelationship with respect to the standard of the system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A multiple port protocol test apparatus, comprising:

a test management unit for testing and controlling a protocol and performing a management related thereto;

a multiple port protocol testing unit connected to the test management unit for generating and controlling a test event with respect to the multiple port of a network system;

a plurality of lower protocol processing unit connected to the multiple port protocol test unit for performing an emulation function with respect to a lower protocol of the test objective protocol, and transferring a test-related event;

a timer processing unit connected to the multiple port protocol testing unit for processing a timer information;

a message distribution unit connected to the lower protocol processing units for transferring a test event to a corresponding port of the test objective system, and transferring the received event to the lower protocol processing unit of a corresponding port; and a test objective system access unit connected to the message distribution unit for a physical connection with a test objective system.

2. The apparatus of claim 1, wherein said test objective system access unit is directed to connecting various physical medium such as a multiple mode optical fiber based on a single mode optical fiber and using a programming interface method (TCP/IP socket interface, etc.) which is capable of communicating between various processors in each testing unit.

3. A multiple port protocol test method, wherein a multiple port protocol test apparatus includes a test management unit for testing and controlling a protocol and performing a management related thereto, a multiple port protocol testing unit connected to the test management unit for generating and controlling a test event with respect to the multiple port of a network system, a plurality of lower protocol processing unit connected to the multiple port protocol testing unit for performing an emulation function with respect to a lower protocol of the test objective protocol, and transferring a test-related event, a timer processing unit connected to the multiple port protocol testing unit for processing a timer information, a message distribution unit connected to the lower protocol processing unit for transferring a test event to a corresponding port of the test objective system, and transferring the received event to the lower protocol processing unit of a corresponding port, and a test objective system access unit connected to the message distribution unit for a physical connection with a test objective system, comprising the steps of:

a first step for initializing the system, setting a communication path with the plurality of lower protocol processing unit, performing a test, receiving a test event based on a test result, and judging the test event type;

a second step for analyzing and processing a received event when an event is received from one of the multiple lower protocol processing unit as a result of the first step, and terminating the test or continuing the test as a result of the analysis a third step for outputting a message which informs that the test is being performed when the event is received from the test management unit as a result of the judgement of the first step; and a fourth step for processing the event when a timer expiry event occurred as a result of the first step, terminating the test in accordance with the comparison result of the test termination condition, and continuing the routine.

4. The method of claim 3, wherein said first step includes the steps of:

a fifth step for initializing the system, setting a communication path with the lower protocol processing unit, receiving the event from the test management unit, and judging the type thereof;

a sixth step for setting a test parameter when a parameter setting request is received as a result of the fifth step and repeatedly performing the routine from the test management event type judgement step 23 of the fifth step; and a seventh step for setting a test group and test item when the test operation request is received as a result of the fifth step, performing a test, receiving a test event in accordance with a test operation result, and judging the test event type.

5. The method of claim 3, wherein said second step includes the steps of:

an eighth step for analyzing and processing the received event when the event is received from one of the plurality of the lower protocol processing unit; and comparing the analysis result with the test termination condition;

a ninth step for judging the test result when the comparison result is related to the termination as a result of the eighth step, and termination the test performed; and a tenth step for performing the next test step when the comparison result of the eighth step is not related to the termination, namely, it is referred to the test continuation, receiving the test event of the first step, and judging the type thereof.

* * * * *